(12) United States Patent
Cao et al.

(10) Patent No.: US 9,230,225 B2
(45) Date of Patent: Jan. 5, 2016

(54) PRODUCT QUALITY TRACING TO LOCATE UNSAFE PRODUCT MATERIAL

(71) Applicant: International Business Machines Corporation, Armonk, NY (US)

(72) Inventors: Rong Zeng Cao, Beijing (CN); Xiao Guang Rui, Beijing (CN); Wen Li Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 13/687,266

(22) Filed: Nov. 28, 2012

(65) Prior Publication Data

US 2013/0138235 A1 May 30, 2013

(30) Foreign Application Priority Data

Nov. 30, 2011 (CN) .......................... 2011 1 0390579

(51) Int. Cl.
*G06Q 10/06* (2012.01)
(52) U.S. Cl.
CPC ...................................... *G06Q 10/06* (2013.01)
(58) Field of Classification Search
CPC ........................... G06Q 10/06; G06Q 10/06395
See application file for complete search history.

(56) References Cited

U.S. PATENT DOCUMENTS

| | | | | | |
|---|---|---|---|---|---|
| 4,334,920 | A | * | 6/1982 | Mori et al. | 75/449 |
| 4,464,197 | A | * | 8/1984 | Calderon | 75/10.15 |
| 4,819,176 | A | * | 4/1989 | Ahmed et al. | 700/109 |
| 4,870,022 | A | * | 9/1989 | Fukuyasu et al. | 99/275 |
| 4,976,137 | A | * | 12/1990 | Decker et al. | 324/439 |
| 5,195,921 | A | * | 3/1993 | Ledet | 452/4 |
| 5,210,241 | A | * | 5/1993 | Lin | 554/8 |
| 5,423,284 | A | * | 6/1995 | Nishimura et al. | 117/84 |
| 7,209,846 | B2 | * | 4/2007 | Tamaki et al. | 702/84 |
| 7,401,728 | B2 | * | 7/2008 | Markham et al. | 235/376 |
| 7,729,932 | B2 | * | 6/2010 | Yokota et al. | 705/7.17 |
| 7,882,438 | B2 | * | 2/2011 | Markham et al. | 715/736 |
| 8,229,584 | B2 | * | 7/2012 | Higashide et al. | 700/110 |
| 8,533,149 | B2 | * | 9/2013 | Roediger et al. | 707/601 |
| 8,799,113 | B2 | * | 8/2014 | Markham et al. | 705/29 |
| 2004/0177011 | A1 | * | 9/2004 | Ramsay et al. | 705/28 |
| 2005/0027482 | A1 | * | 2/2005 | Benaoudia et al. | 702/183 |
| 2006/0047705 | A1 | | 3/2006 | Reade et al. | |
| 2011/0300397 | A1 | * | 12/2011 | Sugita et al. | 428/577 |
| 2012/0136629 | A1 | * | 5/2012 | Tamaki et al. | 702/183 |

FOREIGN PATENT DOCUMENTS

CN 1670743 A 9/2005
CN 101882265 A 11/2010

OTHER PUBLICATIONS

English abstract of CN 1670743, dated Sep. 21, 2005.

* cited by examiner

*Primary Examiner* — Ramesh Patel
(74) *Attorney, Agent, or Firm* — Cahn & Samuels, LLP

(57) ABSTRACT

A method and apparatus of tracing product quality to improve product safety. The method and apparatus can rapidly locate sources of product raw materials causing product quality safety incidents, which prevent further development of incidents and additional losses. The method is based on using a product production plan, and creating product raw material combinations corresponding to product batches and decision rules for determining sources of unqualified product raw materials. In response to when a product quality issue arises using the decision rules when producing products according to the product raw material combinations helps to quickly determine the sources of unqualified product raw materials and improves product quality safety.

14 Claims, 4 Drawing Sheets

PRODUCT QUALITY TRACING TO LOCATE UNSAFE PRODUCT MATERIAL

CROSS-REFERENCE TO RELATED APPLICATION

This application claims priority under 35 U.S.C. §119 from Chinese Patent Application No. 201110390579.3 filed Nov. 30, 2011, the entire contents of which are incorporated herein by reference.

BACKGROUND OF THE INVENTION

1. Field of the Invention

The present invention relates to product quality safety, and more specifically, to a method and apparatus for tracing product quality.

2. Description of the Related Art

Product quality safety incidents frequently occurred recently, such as, *enterobacter sakazakii* in baby milk powder, melamine-tainted toxic milk powder, and global car recall events. Emergency response to product quality safety events needs to establish a rapid reaction mechanism of product quality safety for rapidly locating sources of raw materials that do not comply with product quality requirements, to prevent further development of those incidents and additional losses.

Existing measures of emergency response to product quality safety events often realize location through defective product inspection after the occurrence of incidents, for example, 1) through directly inspecting raw materials, which might not be easily available due to raw material depletion or difficulty in storage; 2) through establishing a tracing network of product quality. Through recording product information in each stage of production, fabrication, storage, transportation, and distribution, tracing product quality establishes a tracing network of information flow from raw materials to finished products. With inference based on the product tracing network, it is possible to determine the probabilities of unqualified raw materials, other than directly determining what raw materials are unqualified. Taking toxic milk powder as an example, since raw milk materials from many milk stations are fixed in a dairy plant, it is difficult to trace to the sources of raw milk materials that incur quality safety incidents.

A key point of establishing a product quality rapid reaction mechanism is to find out the source of product quality safety incidents. Therefore, there is a need for a method for rapidly and accurately locating the source of product raw materials causing product quality safety incidents.

SUMMARY OF THE INVENTION

In view of the above issues, this invention provides a method and apparatus of tracing product quality.

One aspect of this invention, a method of tracing product quality is provided, which includes: producing product raw material combinations corresponding to product batches and decision rules for determining sources of unqualified product raw materials by using a product production plan; producing products according to the product raw material combinations; and determining sources of unqualified product raw materials according to the decision rules in response to product quality issues that might occur.

Another aspect of this invention, an apparatus of tracing product quality is provided, which includes: an optimization module configured to produce product raw material combinations corresponding to product batches and decision rules for determining sources of unqualified product raw materials based on a product production plan; a production module configured to produce products according to the product raw material combinations; and a decision module configured to determine sources of unqualified product raw materials in response to product quality issues which arise from the decision rules.

The method and apparatus of tracing product quality according to the various aspects of this invention can rapidly locate sources of product raw materials causing product quality safety incidents, to prevent further development of incidents and additional losses.

BRIEF DESCRIPTION OF THE DRAWINGS

Features, advantages, and other aspects of various embodiments of the present invention will become more apparent from the following detailed description, when taken in conjunction with the figures illustrate several embodiments of the present invention in an exemplary rather than limiting manner.

DETAILED DESCRIPTION OF THE PREFERRED EMBODIMENT

Below, a method and apparatus of tracing product quality according to various embodiments of this invention will be described in conjunction with accompanying drawings for the further understanding of objects and advantages of this invention.

Figure 1:
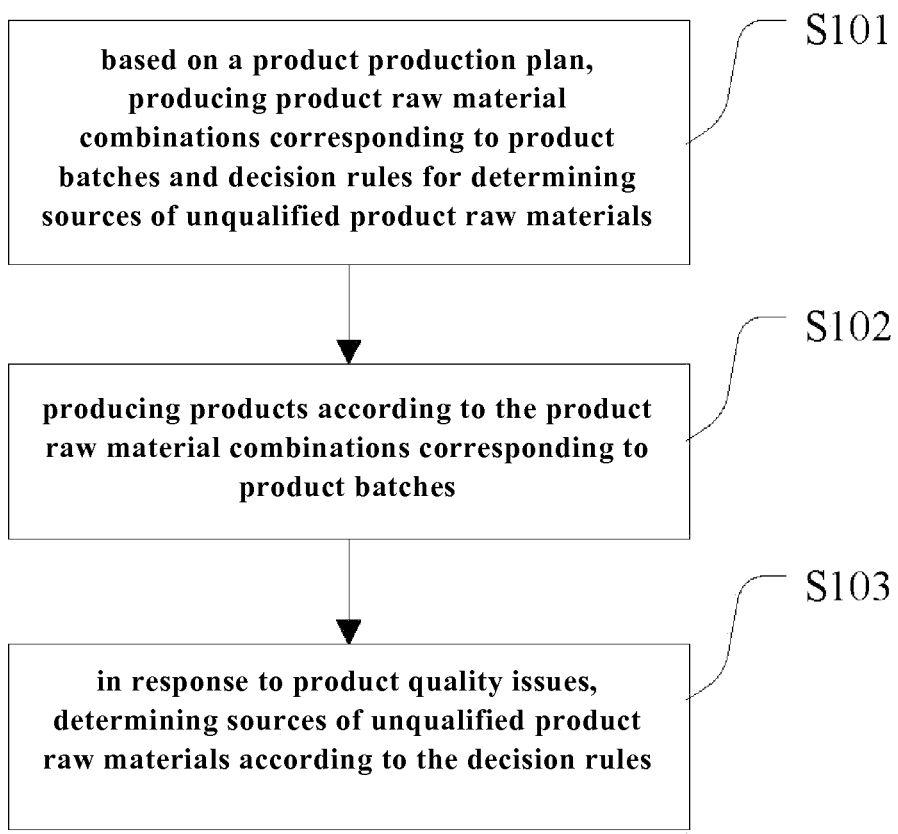
FIG. 1 shows a method of tracing product quality according to an embodiment of the present invention.

FIG. 1 shows a method of tracing product quality according to an embodiment of this invention. At step S101, based on a product production plan, product raw material combinations corresponding to product batches and decision rules for determining sources of unqualified product raw materials are produced; at step S102, products are produced according to the product raw material combinations; at step S103, sources of unqualified product raw materials are determined in response to product quality issues according to the decision rules.

Figure 2:
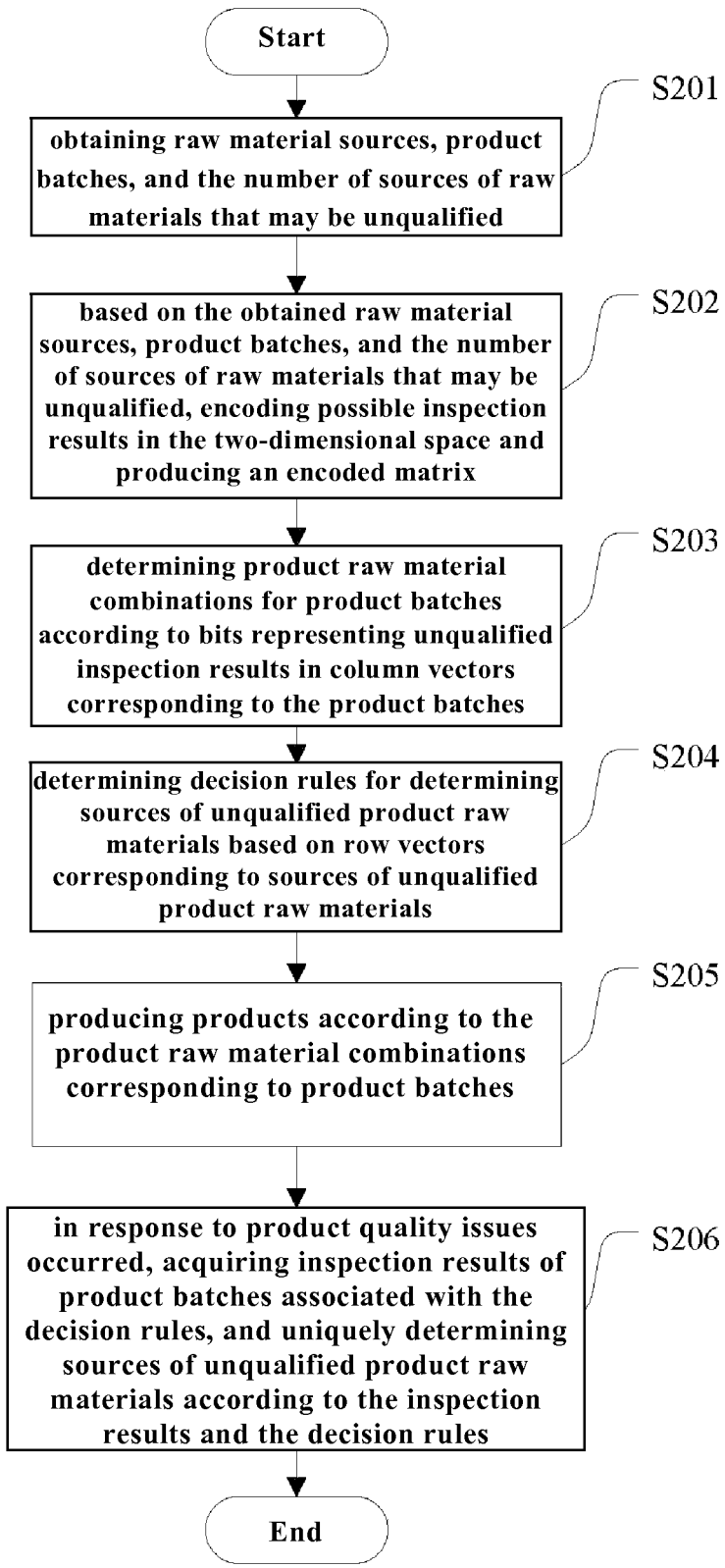
FIG. 2 shows a flowchart of a method of tracing product quality according to one embodiment of the present invention.

FIG. 2 shows a flowchart of a method of tracing product quality according to one embodiment of the present invention, including step S201 of obtaining raw material sources, product batches, and the number of sources of raw materials that can be unqualified, where the product production plan includes product raw material sources, product batches, product numbers, quality, and raw material component ratios, thereby the raw material sources and product batches can be retrieved from the product production plan, and the number of sources of raw materials that are unqualified can be obtained from historical feedback records of product quality.

At step S202, based on the obtained raw material sources, product batches, and the number of sources of raw materials that can be unqualified, possible inspection results are encoded in the two-dimensional space and an encoded matrix is produced, where row vectors of the encoded matrix correspond to sources of unqualified product raw materials, and column vectors of the encoded matrix correspond to product batches. An encoding distance between any two row vectors of the encoded matrix can be determined based on the number of sources of raw materials that can be unqualified.

Possible inspection results are encoded in the two-dimensional space to produce an encoded matrix A:

$$A = \begin{bmatrix} a_{11} & \cdots & a_{1M} \\ \vdots & \ddots & \vdots \\ a_{N1} & \cdots & a_{NM} \end{bmatrix}_{N \times M}$$

A row vector is denoted as $A_{i\cdot} = [a_{i1}, \ldots, a_{iM}]$, which corresponds to a product raw material combination $\bar{n}_i$, A column vector is denoted as $A_{\cdot j} = [a_{1j}, \ldots, a_{Nj}]^T$, which corresponds to a product batch $m_j$, Where row vectors satisfy $|A_{i\cdot} - A_{\cdot j}| \geq C$, Where column vectors satisfy $\Sigma_i A_{ij} \cdot \text{weight}(n_i) = \text{weight}(m_j)$, $1 \leq i \leq N$, weight( ) denotes the quality of raw materials or products.

The two-dimensional codes need to satisfy the following two conditions:

1) $|s(f^{-1}(n_k)) - s(f^{-1}(n_j))| \geq C$, $C \geq 0$, $1 \leq k, j \leq N$ and $k \neq j$, $N \in$ positive integers;

2) $q(m_i) = q(f(m_i))$, $1 \leq i \leq M$, $M \in$ positive integers;

Here $m_i$ denotes the $i_{th}$ product batch; $n_j$ and $n_k$ respectively denote the $j_{th}$ raw material source and the $k_{th}$ raw material source; $f( )$ denotes a component function of product batches; $f^{-1}( )$ denotes a reversed function of the component function of product batches; $q( )$ denotes a mass calculation function; $s( )$ denotes a binary encoding function; and C denotes the number of sources of potential unqualified product raw materials.

At step S203, according to bits representing unqualified inspection results in column vectors corresponding to product batches, product raw material combinations are determined for the product batches; specifically, according to bits corresponding to individual unqualified raw material sources and representing unqualified inspection results in column vectors corresponding to product batches, product raw material combinations are determined for that product batches. At step 204, decision rules for determining unqualified product sources are determined based on row vectors corresponding to sources of unqualified product raw materials. At step S205, products are produced according to the product raw material combinations corresponding to product batches. At step S206, in response to product quality issues, inspection results of product batches associated with the decision rules are obtained, and sources of unqualified product raw materials are uniquely determined according to the inspection results and the decision rules.

Figure 3:
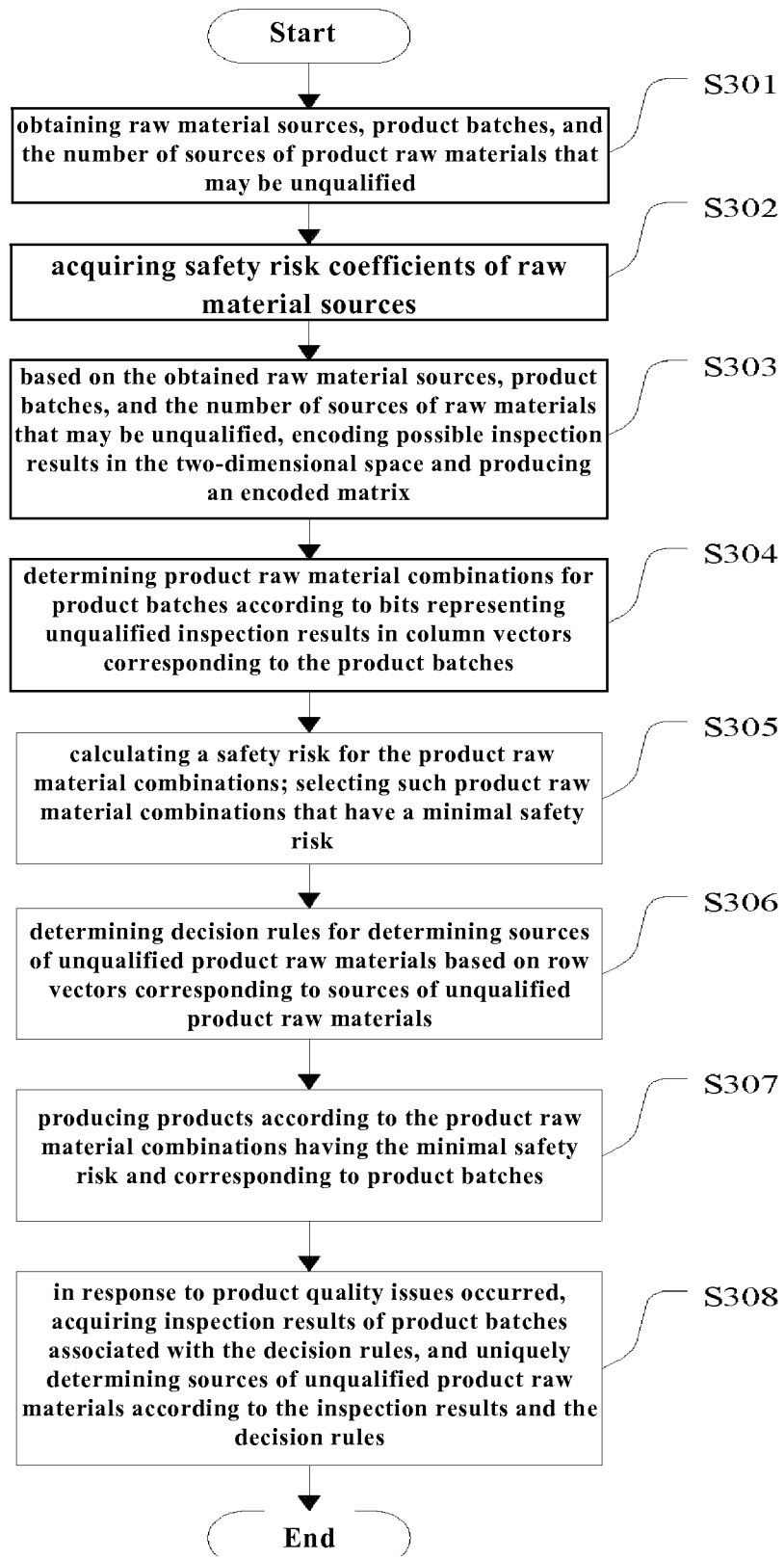
FIG. 3 shows a flowchart of a method of tracing product quality according to one embodiment of the present invention.

FIG. 3 shows a flowchart of a method of tracing product quality for the present invention. At step S301, raw material sources, product batches, and the number of sources of raw materials that can be unqualified are obtained. At step S302, safety risk coefficients of raw material sources are obtained, the safety risk coefficients of raw material sources can be acquired from statistical historical feedback records of product quality. At step S303, possible inspection results can be encoded in the two-dimensional space to produce an encoded matrix, where row vectors of the encoded matrix correspond to sources of unqualified product raw materials, and column vectors of the encoded matrix correspond to produce batches.

An encoding distance between any two row vectors of the encoded matrix can be determined based on the number of sources of potential unqualified product raw materials. At step S304, according to bits representing unqualified inspection results in column vectors corresponding to the product batches, product raw material combinations are determined for the product batches; specifically, according to bits corresponding to individual unqualified raw material sources and representing unqualified inspection results in column vectors corresponding to the product batches, product raw material combinations are determined for that product batches. At step S305, a safety risk is calculated for the product raw material combinations and select product raw material combinations that have a minimal safety risk. At step S306, decision rules for determining unqualified product sources are determined based on row vectors corresponding to sources of unqualified product raw materials. At step S307, products are produced according to the product raw material combinations corresponding to the product batches which have a minimal safety risk. At step S308, in response to product quality issues, inspection results of product batches associated with the decision rules are obtained, and sources of unqualified product raw materials are uniquely determined according to the inspection results and the decision rules.

The present invention, where selecting raw food material combinations capable of locating sources of unqualified foods includes: acquiring safety risks of sources of raw food materials; calculating a safety risk for raw food material combinations complied with a food production plan; and selecting such raw food material combinations that have a minimal safety risk.

Taking production of dairy products as an example, according to a production plan, dairy products are produced with milk coming from four milk stations A, B, C, and D as raw materials, in four batches M, N, P, and Q, where the products in each batch require 3 volumes of milk, and according to historical records, it is determined that only one milk station is prone to have quality problems; according to the present invention, possible inspection results are encoded in the two-dimensional space, an encoding distance between any two row vectors is determined according to the number of sources of potentially questionable raw materials, where row vectors of the two-dimensional matrix correspond to unqualified milk station combinations of A, B, C, and D, and column vectors of the two-dimensional matrix correspond to product batches M, N, P, and Q. In the case of only one food source that has questionable quality, "1" represents that a certain batch of products has quality problems, "0" represents that a certain batch of products is qualified, an encoded matrix A according to the present invention is shown as below:

$$A = \begin{array}{c} \begin{array}{cccc} M & N & P & Q \end{array} \\ \begin{bmatrix} 0 & 0 & 1 & 0 \\ 0 & 0 & 1 & 1 \\ 1 & 0 & 0 & 0 \\ 1 & 1 & 0 & 0 \end{bmatrix} \end{array} \begin{array}{l} \text{milk station } A \\ \text{milk station } B \\ \text{milk station } C \\ \text{milk station } D \end{array}$$

According to bits corresponding to individual unqualified raw material sources and representing unqualified inspection results in column vectors corresponding to the product batches, product raw material combinations are determined for that product batches. The combination of batch M is milk stations C and D, the combination of batch N is milk station D, the combination of batch P is milk stations A and B, the combination of batch Q is milk station B. According to the principle of mass conservation of all batch masses and product sources, product raw material component ratios are calculated for respective batches. Table 1 shows the product raw material component ratios of those batches, where batch M has a component ratio of two volumes of milk coming from milk station C and one volume of milk coming from milk station D. Batch N has a component ratio of three volumes of milk coming from milk station D. Batch P has a component ratio of two volumes of milk coming from milk station A and one volume of milk coming from milk station B; and batch Q has a component ratio of three volumes of milk coming from milk station B.

TABLE 1

| Food batch | Raw food martial component ratio |
|---|---|
| M | $C_2D_1$ |
| N | $D_3$ |
| P | $A_2B_1$ |
| Q | $B_3$ |

Decision rules for determining sources of unqualified products are determined based on row vectors corresponding to sources of unqualified product raw materials in the encoded matrix A. Table 2 shows decision rules for quality problems occurred, inspection results of product batches associated with that decision rules, and sources of unqualified product raw materials which can be uniquely determined according to the inspection results and the decision rules, where "1" represents that a certain batch of products has quality problems, "0" represents that a certain batch of products is qualified, for example: decision rules [0010] denotes if product batch P has problems, and other product batches are qualified, then milk station A is questionable; decision rules [0011] denotes if product batches P and Q have problems, and product batches M and N are qualified, then milk station B is questionable; decision rules [1000] denotes if product batch M has problems, and other product batches are qualified, then milk station C is questionable; and finally decision rules [1100] denotes if product batches M and N have problems, and other product batches are qualified, then milk station D is questionable;

TABLE 2

| M | N | P | Q | Sources of unqualified food |
|---|---|---|---|---|
| 0 | 0 | 1 | 0 | Milk station A |
| 0 | 0 | 1 | 1 | Milk station B |
| 1 | 0 | 0 | 0 | Milk station C |
| 1 | 1 | 0 | 0 | Milk station D |

Therefore, if it is determined that there is only one source of a questionable raw material, the source of the unqualified raw material can be uniquely determined.

Taking household detergent production as an example, a household detergent is produced with alkanolamide from four chemical plants A, B, C, and D as its chemical raw materials. According to a production plan, five batches of household detergent M, N, P, Q, and R are produced every day, where each batch of household detergent needs 2.4 volumes of alkanolamide. Alkanolamide is transported every day from four chemical plants A, B, C, and D in the following quantities 2, 2, 4, 4 volumes respectively, and it is determined according to historical records that the number of chemical plants that can have quality problems $\leq 2$. Inspection results are encoded in the two-dimensional space, and it is determined based on the number of sources of raw materials that can have quality problems that the encoding distance between any two row vectors is 2, where the row vectors of the encoded matrix correspond to combinations of unqualified chemical plants A, B, C, and D, and the column vectors of the encoded matrix correspond to product batches M, N, P, Q, and R, "1" represents that a certain batch of products has quality problems, "0" represents that a certain batch of products is qualified, an encoded matrix B according to the embodiment of this invention is shown as below:

$$B = \begin{bmatrix} 0 & 1 & 1 & 0 & 0 \\ 0 & 0 & 1 & 1 & 0 \\ 1 & 0 & 0 & 1 & 1 \\ 1 & 1 & 0 & 0 & 0 \\ 0 & 1 & 1 & 1 & 0 \\ 1 & 1 & 1 & 1 & 1 \\ 1 & 1 & 1 & 0 & 0 \\ 1 & 0 & 1 & 1 & 1 \\ 1 & 1 & 1 & 1 & 0 \\ 1 & 1 & 0 & 1 & 1 \end{bmatrix}_{10 \times 5} \begin{array}{l} \text{chemical plant } A \\ \text{chemical plant } B \\ \text{chemical plant } C \\ \text{chemical plant } D \\ \text{chemical plants } A \text{ and } B \\ \text{chemical plants } A \text{ and } C \\ \text{chemical plants } A \text{ and } D \\ \text{chemical plants } B \text{ and } C \\ \text{chemical plants } B \text{ and } D \\ \text{chemical plants } C \text{ and } D \end{array}$$

According to bits corresponding to individual unqualified raw material sources and representing unqualified inspection results in column vectors corresponding to the product batches, product raw material combinations are determined for that product batches. The combination of batch M is the alkanolamide coming from chemical plants C and D, the combination of batch N is the alkanolamide coming from chemical plants A and D, the combination of batch P is the alkanolamide coming from chemical plants A and B, the combination of batch Q is the alkanolamide coming from chemical plants B and C, the combination of batch R is the alkanolamide coming from chemical plant C. According to the principle of mass conservation of all batch masses and product sources, product raw material component ratios are calculated for respective batches. Table 2 shows the product raw material component ratios of those batches, where the household detergent of batch M has a component ratio of 0.4 volume of alkanolamide coming from chemical plant C and 2 volumes of alkanolamide coming from chemical plant D; the household detergent of batch N has a component ratio of 0.4 volume of alkanolamide coming from chemical plant A and 2 volumes of alkanolamide coming from chemical plant D; the household detergent of batch P has a component ratio of 1.6 volume of alkanolamide coming from chemical plant A and 0.8 volume of alkanolamide coming from chemical plant B; the household detergent of batch Q has a component ratio of 1.2 volumes of alkanolamide coming from chemical plant B and 1.2 volumes of alkanolamide coming from chemical plant C; the household detergent of batch R has a component ratio of 2.4 volumes of alkanolamide coming from chemical plant C.

TABLE 3

| Product batch | component ratio of raw materials |
|---|---|
| M | $C_{0.4}D_2$ |
| N | $A_{0.4}D_2$ |
| P | $A_{1.6}B_{0.8}$ |
| Q | $B_{1.2}C_{1.2}$ |
| R | $C_{2.4}$ |

In the case of the number of sources of unqualified raw materials 2, decision rules for determining sources of unqualified products are determined based on row vectors corresponding to sources of unqualified product raw materials in the encoded matrix B. Table 4 shows decision rules for quality problems occurred, inspection results of product batches associated with that decision rules, and sources of unqualified product raw materials which can be uniquely determined according to the inspection results and the decision rules, where "1" represents that a certain batch of products has quality problems, "0" represents that a certain batch of products is qualified, for example: decision rules [01100] denotes if product batches N and P have problems, and other product batches are qualified, then chemical plant A is questionable; decision rules [00110] denotes if product batches P and Q have problems, and product batches M, Q, and R are qualified, then chemical plant B is questionable; decision rules [10011] denotes if product batches M, Q, and R have problems, and product batches N and P are qualified, then chemical plant C is questionable; decision rules [11000] denotes if product batches M and N have problems, and other product batches are qualified, then chemical plant D is questionable; decision rules [01110] denotes if product batches N, P, and Q have problems, and product batches M and R are qualified, then chemical plants A and B are questionable; decision rules [11111] denotes if all of product batches M, N, P, Q, and R have problems, then chemical plants A and C are questionable; decision rules [11100] denotes if product batches M, N, and P have problems, and product batches Q and R are qualified, then chemical plants A and D are questionable; decision rules [10111] denotes if product batches M, P, Q, and R have problems, and product batch N is qualified, then chemical plants B and C are questionable; decision rules [11110] denotes if product batches M, N, P, and Q have problems, and product batch R is qualified, then chemical plants B and D are questionable; decision rules [11011] denotes if product batches M, N, Q, and R have problems, and product batch P is qualified, then chemical plants C and D are questionable.

Specific decision steps according to the decision rules of table 4 are listed in detail below:

1) if batches N and P have problems, since batches M, Q, and R are qualified, it can be determined that raw materials of chemical plants B, C, and D are qualified, and thereby raw material of chemical plant A is unqualified;

2) if batches P and Q have problems, since batches M, N, and R are qualified, it can be determined that raw materials of chemical plants A, C, and D are qualified, and thereby raw material of chemical plant B is unqualified;

3) if batches M, Q, and R have problems, since batches N and P are qualified, it can be determined that raw materials of chemical plants A, B, and D are qualified, and thereby raw material of chemical plant C is unqualified;

4) if batches M and N have problems, since batches P, Q, and R are qualified, it can be determined that raw materials of chemical plants A, B, and C are qualified, and thereby raw material of chemical plant D is unqualified;

5) if batches N, P, and Q have problems, since batches M and R are qualified, it can be determined that raw materials of chemical plants C and D are qualified, and thereby raw materials of chemical plant A and B are unqualified;

6) if batches M, N, P, Q, and R have problems, it can be determined that raw materials of chemical plants B and D are qualified, and thereby raw materials of chemical plants A and C are unqualified;

7) if batches M, P, and N have problems, since batches Q and R are qualified, it can be determined that raw materials of chemical plants B and C are qualified, and thereby raw materials of chemical plants A and D are unqualified;

8) if batches M, P, Q, and R have problems, since batch N is qualified, it can be determined that raw materials of chemical plants A and D are qualified, and thereby raw materials of chemical plants B and C are unqualified;

9) if batches M, N, P, and Q have problems, since batch R is qualified, it can be determined that raw materials of chemical plants A and C are qualified, and thereby raw materials of chemical plants B and D are unqualified;

10) if batches M, N, Q, and R have problems, since batch P is qualified, it can be determined that raw materials of chemical plants A and B are qualified, and thereby raw materials of chemical plants C and D are unqualified.

Still taking household detergent production as an example, average safety risk probabilities of alkanolamide productions of chemical plants A, B, C, and D as raw material sources are acquired from historical data, as shown in table 5.

TABLE 4

| M | N | P | Q | R | Sources of unqualified products |
|---|---|---|---|---|---|
| 0 | 1 | 1 | 0 | 0 | Chemical plant A |
| 0 | 0 | 1 | 1 | 0 | Chemical plant B |
| 1 | 0 | 0 | 1 | 1 | Chemical plant C |
| 1 | 1 | 0 | 0 | 0 | Chemical plant D |
| 0 | 1 | 1 | 1 | 0 | Chemical plants A and B |
| 1 | 1 | 1 | 1 | 1 | Chemical plants A and C |
| 1 | 1 | 1 | 0 | 0 | Chemical plants A and D |
| 1 | 0 | 1 | 1 | 1 | Chemical plants B and C |
| 1 | 1 | 1 | 1 | 0 | Chemical plants B and D |
| 1 | 1 | 0 | 1 | 1 | Chemical plants C and D |

TABLE 5

| Raw material source | Chemical plant A | Chemical plant B | Chemical plant C | Chemical plant D |
|---|---|---|---|---|
| Average safety risk | 5% | 5% | 30% | 20% |

A method of calculating product risk probability is as follow:

The product risk probability of a certain product batch is equal to the risk of corresponding raw materials: 4

Taking table 3 as an example, the risk probability of product batch M is:

$$r(M)=r(C \cup D)=r(C)+r(D)-r(C)r(D)$$

as a result $r(M)=0.44$.

Similarly, the risk probability of product batch N is:

$$r(N)=r(A \cup D)=r(A)+r(D)-r(A)r(D)$$

as a result $r(N)=0.24$.

The risk probability of product batch P is:

$$r(P)=r(A\cup B)=r(A)+r(B)-r(A)r(B)$$

as a result r(P)=0.075.

$$r(Q)=r(B\cup C)=r(B)+r(C)-r(B)r(C)$$

as a result r(Q)=0.335

$$r(R)=r(C)=0.3.$$

Table 6 shows product risk probabilities corresponding to respective batches of above discussed household detergent production example.

TABLE 6

| Product batch | Product raw material component ratio | Product risk |
|---|---|---|
| M | $C_{0.4}D_2$ | 0.44 |
| N | $A_{0.4}D_2$ | 0.24 |
| P | $A_{1.6}B_{0.8}$ | 0.075 |
| Q | $B_{1.2}C_{1.2}$ | 0.335 |
| R | $C_{2.4}$ | 0.30 |

The total product risk=(r(M)+r(N)+r(P)+r(Q)+r(R))/5=0.278.

According to the present invention, an eligible encoded matrix C is calculated, according to bits corresponding to individual unqualified raw material sources and representing unqualified inspection results in column vectors corresponding to product batches, product raw material combinations are determined for that product batches. The combination of batch M is the alkanolamide coming from chemical plants B and C, the combination of batch N is the alkanolamide coming from chemical plant C, the combination of batch P is the alkanolamide coming from chemical plant D, the combination of batch Q is the alkanolamide coming from chemical plants A and B, the combination of batch R is the alkanolamide coming from chemical plants A and D. According to the principle of mass conservation of all batch masses and product sources, product raw material component ratios are calculated for respective batches. Table 5 shows product raw material component ratios of those batches, where household detergent of batch M has a component ratio of 0.8 volume of alkanolamide coming from chemical plant B and 1.6 volumes of alkanolamide coming from chemical plant C; household detergent of batch N has a component ratio of 2.4 volumes of alkanolamide coming from chemical plant C; household detergent of batch P has a component ratio of 2.4 volumes of alkanolamide coming from chemical plant D; household detergent of batch Q has a component ratio of 1.2 volumes of alkanolamide coming from chemical plant B and 1.2 volumes of alkanolamide coming from chemical plant C; household detergent of batch R has a component ratio of 0.8 volume of alkanolamide coming from chemical plant A and 1.6 volumes of alkanolamide coming from chemical plant D.

$$C = \begin{bmatrix} 0 & 0 & 0 & 1 & 1 \\ 1 & 0 & 0 & 1 & 0 \\ 1 & 1 & 0 & 0 & 0 \\ 0 & 0 & 1 & 0 & 1 \\ 1 & 0 & 0 & 1 & 1 \\ 1 & 1 & 0 & 1 & 1 \\ 0 & 0 & 1 & 1 & 0 \\ 1 & 1 & 0 & 1 & 0 \\ 1 & 0 & 1 & 1 & 1 \\ 1 & 1 & 1 & 0 & 1 \end{bmatrix}_{10\times 5} \begin{array}{l} \text{chemical plant } A \\ \text{chemical plant } B \\ \text{chemical plant } C \\ \text{chemical plant } D \\ \text{chemical plants } A \text{ and } B \\ \text{chemical plants } A \text{ and } C \\ \text{chemical plants } A \text{ and } D \\ \text{chemical plants } B \text{ and } C \\ \text{chemical plants } B \text{ and } D \\ \text{chemical plants } C \text{ and } D \end{array}$$

Column headers: M N P Q R

TABLE 7

| Product batch | component ratio of raw materials | Product risk |
|---|---|---|
| M | $B_{0.8}C_{1.6}$ | 0.335 |
| N | $C_{2.4}$ | 0.30 |
| P | $D_{2.4}$ | 0.20 |
| Q | $A_{1.2}B_{1.2}$ | 0.075 |
| R | $A_{0.8}D_{1.6}$ | 0.24 |

The risk probability of product batch M is:

$$r(M)=r(B\cup C)=r(B)+r(C)-r(B)r(C)$$

as a result r(M)=0.335.
Similarly, the risk probability of product batch N is:

$$r(N)=r(C)=0.3$$

The risk probability of product batch P is:

$$r(P)=r(D)=0.2$$

$$r(Q)=r(A\cup B)=r(A)+r(B)-r(A)r(B)$$

as a result r(Q)=0.075.

$$r(Q)=r(A\cup D)=r(A)+r(D)-r(A)r(D)$$

as a result r(Q)=0.24.
The total product risk=(r(M)+r(N)+r(P)+r(Q)+r(R))/5=0.23.

Because the total product risk of table 7 is less than that of household detergent production example, the combinations of table 7 are selected for product production.

In the case of the number of sources of unqualified raw materials decision rules for determining sources of unqualified products are determined based on row vectors corresponding to sources of unqualified product raw materials in encoded matrix C. Table 8 shows decision rules for quality problems occurred, inspection results of product batches associated with that decision rules, and sources of unqualified product raw materials which can be uniquely determined according to the inspection results and the decision rules, where "1" represents that a certain batch of products has quality problems, "0" represents that a certain batch of products is qualified, for example: decision rules [00011] denotes if product batches Q and R have problems, and product batches M, N, and P are qualified, then chemical plant A is questionable; decision rules [10010] denotes if product batches M and Q have problems, and product batches N, P, and R are qualified, then chemical plant B is questionable; decision rules [11000] denotes if product batches M and N have problems, and product batches P, Q, and R are qualified, then chemical plant C is questionable; decision rules [00101] denotes if product batches P and R have problems, and product batches M, N, and Q are qualified, then chemical plant D is questionable; decision rules [10011] denotes if product batches M, Q, and R have problems, and product batches N and P are qualified, then chemical plants A and B are questionable; decision rules [11011] denotes if product batches M, N, Q, and R have problems, and product batch P is qualified, then chemical plants A and C are questionable; decision rules [00110] denotes if product batches P and Q have problems, and product batches M, N, and R are qualified, then chemical plants A and D are questionable; decision rules [11010] denotes if product batches M, N, and Q have problems, and product batches P and R are qualified, then chemical plants B and C are questionable; decision rules [10111] denotes if product batches M, P, Q, and R have problems, and product batch N is qualified, then chemical plants B and D are questionable; and decision rules [11101] denotes if product batches M, N, P, and R have problems, and product batch Q is qualified, then chemical plants C and D are questionable.

TABLE 8

| M | N | P | Q | R | Sources of unqualified products |
|---|---|---|---|---|---|
| 0 | 0 | 0 | 1 | 1 | Chemical plant A |
| 1 | 0 | 0 | 1 | 0 | Chemical plant B |
| 1 | 1 | 0 | 0 | 0 | Chemical plant C |
| 0 | 0 | 1 | 0 | 1 | Chemical plant D |
| 1 | 0 | 0 | 1 | 0 | Chemical plants A and B |
| 1 | 1 | 0 | 1 | 1 | Chemical plants A and C |
| 0 | 0 | 1 | 1 | 0 | Chemical plants A and D |
| 1 | 1 | 0 | 1 | 0 | Chemical plants B and C |
| 1 | 0 | 1 | 1 | 1 | Chemical plants B and D |
| 1 | 1 | 1 | 0 | 1 | Chemical plants C and D |

The specific decision steps according to the decision rules of table 8 are listed in detail below:

1) if batch M is unqualified, then the quality of batch N is inspected,
   1.1 if batch N is qualified, then the quality of batch P is inspected,
   1.1.1 if batch P is qualified, then the quality of batch R is inspected,
   1.1.1.1 if batch R is qualified, then chemical plant B is determined as questionable;
   1.1.1.2 if batch R is unqualified, then chemical plants A and B are determined as questionable;
   1.1.2 if batch P is unqualified, then chemical plants B and D are determined as questionable;
   1.2 if batch N is unqualified, then the quality of batch P is inspected,
   1.2.1 if batch P is qualified, then the quality of batch Q is inspected,
   1.2.1.1 if batch Q is qualified, then chemical plant C is determined as questionable;
   1.2.1.2 if batch Q is unqualified, then the quality of batch R is inspected,
   1.2.1.2.1 if batch R is qualified, then chemical plants B and C are determined as questionable;
   1.2.1.2.2 if batch R is unqualified, then chemical plants A and C are determined as questionable;
   1.2.2 if batch P is unqualified, then chemical plants C and D are determined as questionable;
2) if batch N is unqualified, then the quality of batch P is inspected,
   2.1 if batch P is qualified, then the quality of batch Q is inspected,
   2.1.1 if batch Q is qualified, then chemical plant C is determined as questionable;
   2.1.2 if batch Q is unqualified, then quality of batch R is inspected;
   2.1.2.1 if batch R is qualified, then chemical plants B and C are determined as questionable;
   2.1.2.2 if batch R is unqualified, then chemical plants A and C are determined as questionable
   2.2 if batch P is unqualified, then the quality of batch P is inspected,
   2.2.1 if batch P is qualified, then chemical plants C and D are determined as questionable;
3) if batch P is unqualified, then the quality of batch N is inspected,
   3.1 if batch N is qualified, then the quality of batch M is inspected,
   3.1.1 if batch P is qualified, then the quality of batch Q is inspected,
   3.1.1.1 if batch Q is qualified, then chemical plant D is determined as questionable;
   3.1.1.2 if batch Q is unqualified, then chemical plants A and D are determined as questionable;
   3.1.2 if batch P is unqualified, then chemical plants B and D are determined as questionable;
   3.2 if batch N is unqualified, then chemical plants C and D are determined as questionable;
4) if batch Q is unqualified, then the quality of batch M is inspected,
   4.1 if batch M is qualified, then the quality of batch P is inspected,
   4.1.1 if batch P is qualified, then the quality of batch N is inspected,
   4.1.1.1 if batch N is qualified, then the quality of batch R is inspected,
   4.1.1.1.1 if batch R is qualified, then chemical plant B is determined as questionable;
   4.1.1.1.2 if batch R is unqualified, then chemical plants A and B are determined as questionable;
   4.1.1.2 if batch N is unqualified, then the quality of batch R is inspected,
   4.1.1.2.1 if batch R is qualified, then chemical plants B and C are determined as questionable;
   4.1.1.2.2 if batch R is unqualified, then chemical plants A and C are determined as questionable;
   4.1.2 if batch P is unqualified, then chemical plants B and D are determined as questionable,
   4.2 if batch M is unqualified, then the quality of batch P is inspected,
   4.2.1 if batch P is qualified, then chemical plant A is determined as questionable,
   4.2.2 if batch P is unqualified, then chemical plants A and D are determined as questionable,
5) if batch R is unqualified, then the quality of batch M is inspected,
   5.1 if batch M is qualified, then the quality of batch Q is inspected,
   5.1.1 if batch Q is qualified, then chemical plant D is determined as questionable,
   5.1.2 if batch Q is unqualified, then the quality of batch P is inspected, 5.1.2.1 if batch P is qualified, then chemical plant A is determined as questionable, 5.1.2.2 if batch P is unqualified, then chemical plants A and D are determined as questionable, 5.2 if batch M is unqualified, then the quality of batch Q is inspected, 5.2.1 if batch Q is qualified, then chemical plants C and D are determined as questionable, 5.2.2 if batch Q is unqualified, then the quality of batch N is inspected, 5.2.2.1 if batch N is qualified, then the quality of batch P is inspected, 5.2.2.1.1 if batch P is qualified, then chemical plants A and B are determined as questionable, 5.2.2.1.2 if batch P is unqualified, then chemical plants B and D are determined as questionable, 5.2.2.2 if batch N is unqualified, then chemical plants A and C are determined as questionable.

Figure 4:
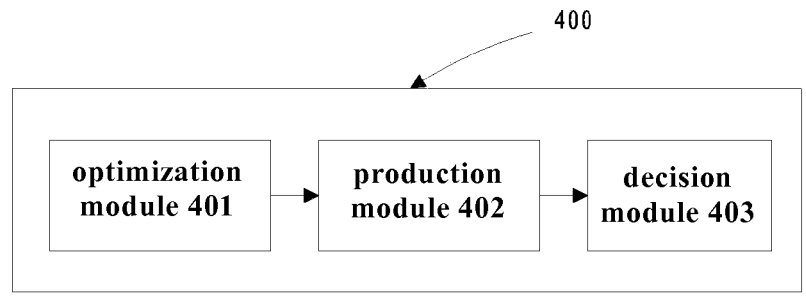
FIG. 4 shows an apparatus of tracing product quality according to embodiments of the present invention.

Based on the same inventive concept, an apparatus of tracing product quality is provided. FIG. 4 shows an apparatus of tracing product quality of the present invention, which includes: an optimization module 401 configured to produce product raw material combinations corresponding to product batches and decision rules for determining sources of unqualified product raw materials based on a product production plan; a production module 402 configured to produce products according to product raw material combinations; a decision module 403 configured to determine sources of unqualified product raw materials in response to product quality issues occurred according to the decision rules.

Where optimization module 401 further includes: an acquiring module configured to acquire raw material sources, product batches, and the number of sources of raw materials that can be unqualified; and an encoding module configured based on the acquired raw material sources, product batches, and the number of sources of raw materials that can be unqualified, encode possible inspection results in the two-dimensional space and produce an encoded matrix, where an encoding distance between any two row vectors of the encoded matrix can be determined based on the number of sources of raw materials that can be unqualified, row vectors of the encoded matrix correspond to the sources of unqualified product raw materials, column vectors of the encoded matrix correspond to the product batches, where the encoding satisfy the following two conditions:

1) $|s(f^{-1}(n_k))-s(f^{-1}(n_j))| \geq C$, $C \geq 0$, $1 \leq k, j \leq N$ and $k \neq j$, N∈positive integers;

2) $q(m_i)=q(f(m_i))$, $1 \leq i \leq M$, M∈positive integers;

where $m_i$ denotes $i_{th}$ product batch; $n_j$ and $n_k$ denote $j_{th}$ raw material source and $k_{th}$ raw material source; $f(\ )$ denotes a component function of product batches; $f^{-1}(\ )$ denotes a reversed function of the component function of product batches; $q(\ )$ denotes a mass calculation function; $s(\ )$ denotes a binary encoding function; and C denotes number of sources of potential unqualified product raw materials.

The present invention, the optimization module is further configured to: according to bits correspond to individual unqualified raw material sources and represent unqualified inspection results in column vectors corresponding to product batches, and to determine product raw material combinations for that product batches.

In the present invention, the optimization module is further configured to determine decision rules for determining unqualified product sources based on row vectors corresponding to sources of the unqualified product raw materials.

In the present invention, the acquiring module is further configured to obtain safety risk coefficients of raw material sources. Where the optimization module is further configured to calculate a safety risk for product raw material combinations; and select such product raw material combinations that have a minimal safety risk.

In the present invention, the decision module is further configured to acquire inspection results of product batches associated with that decision rules, and uniquely determine sources of unqualified product raw materials according to the inspection results and the decision rules.

Figure 5:
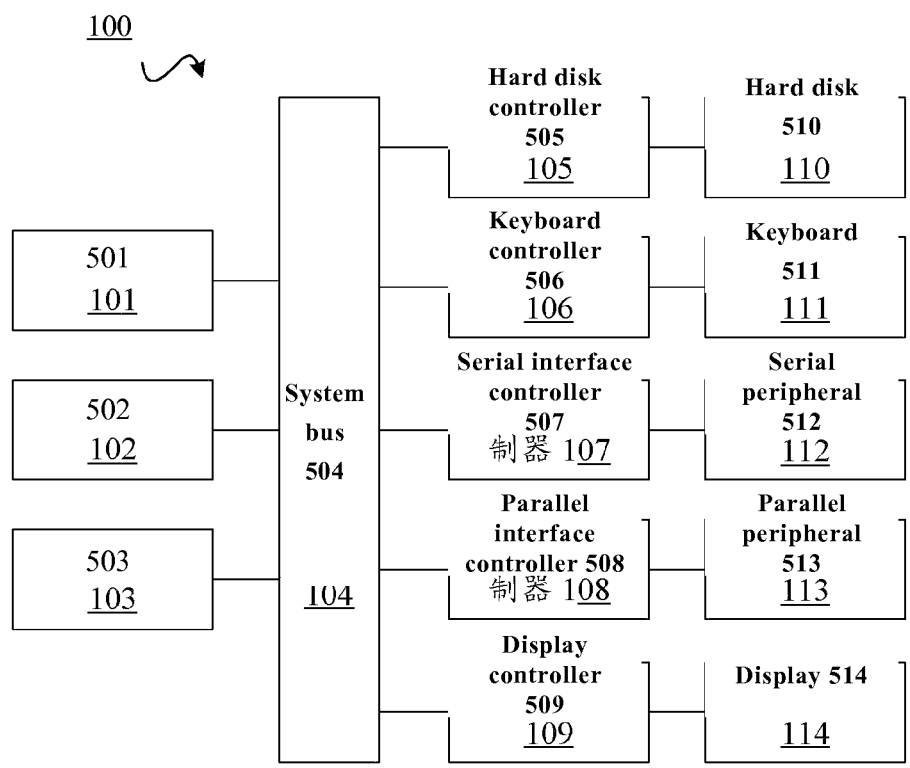
FIG. 5 is a schematic diagram showing a structural block diagram of a computing device for implementing embodiments of this invention.

FIG. 5 schematically shows a structural block diagram of a computing device which is applicable to implement the present invention. As shown in FIG. 5, the computing device includes: CPU (Central Process Unit) 501, RAM (Random Access Memory) 502, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513, and Display 514. The above components, CPU 501, RAM 502, ROM 503, Hard Drive Controller 505, Keyboard Controller 506, Serial Interface Controller 507, Parallel Interface Controller 508, and Display Controller 509 are coupled to the System Bus 504. Hard Drive 510 is coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508, and display 514 is coupled to Display Controller 509.

The function of each component in FIG. 5 is known in the field, and the structure illustrated in FIG. 5 is also conventional. This structure is not only applied in a personal computer, but also in a portable device, like Palm PC, PDA (Personal Digital Assistant) and mobile phone, etc. In various applications, for example a user terminal containing the client module of the present invention or a server host computer containing the network application server of the present invention, some components can be added in the structure illustrated in FIG. 5, or some components in FIG. 5 can be omitted. The whole system shown in FIG. 5 is controlled by computer readable instructions generally stored in hard disk 510 or stored in EPROM or in other non-volatile memory as software. The software can also be downloaded from network (not shown in the figure). It can also be stored in hard disk 510, or the software downloaded from network can also be loaded to RAM 502 and executed by CPU 501 to perform the function defined by the software.

Though the computer system described in FIG. 5 can support the technical scheme provided by the invention, a computer system is only exemplary of a computer system. Those skilled in the art can understand that many other computer system designs can also realize the present invention.

This invention have been described with reference to drawings, however, it is to be understood that the invention is not limited to the disclosure above. Those skilled in the art can make any variant modifications without departing the scope of this invention. The invention is intended to cover all modifications and equivalent arrangements included within the scope of the appended claims.

It should be understood that at least some aspects of the present invention can alternatively be implemented as a computer program product. Programs defining functions of the present invention can be delivered to a data storage system or computer system via a variety of signal-bearing media, which include, without limitation, non-writable storage media (e.g. CD-ROM), writable storage media (e.g. floppy disk, hard disk drive, read/write CD-ROM, optical media), and communication media, such as computer and telephone networks including Ethernet. It should be understood, that such signal-bearing media, when carrying or encoding computer readable instructions that direct method functions of the present invention, represent alternatives of the present invention. This invention can be realized in the form of hardware, software, firmware, or any combination thereof. This invention can be realized in one computer system in a centralized manner, or in a distributed manner, in which various components are distributed among several computer systems connected with each other. Any computer system or other apparatus suitable for carrying out the method described here is applicable. Preferably, the present invention is implemented in a manner of a combination of computer software and general-purpose computer hardware, in this manner of implementation, when the computer program being loaded and executed, the computer system is controlled to carry out the method of the invention, and constitute the apparatus of the invention.

Preferred aspects of this invention have been described above for the purpose of illustration, which is not exhaustive, and it is not intended to limit this invention to the exactly disclosed forms. In view of the above teachings, many modifications and changes are possible. It is obvious for those skilled in the art that such modifications and changes are all covered in the scope of this invention which is defined by the appended claims.

What is claimed is:

1. A method of tracing product quality, comprising:
determining product raw material combinations with a central processing unit (CPU), the product raw material combinations corresponding to product batches and decision rules for determining sources of unqualified product raw materials, based on a product production plan, wherein said determining of the product raw material combinations includes obtaining raw material sources, product batches, and the number of sources of product raw materials that can be unqualified, encoding possible inspection results in a two-dimensional space and producing an encoded matrix, the encoded matrix including:
row vectors corresponding to sources of unqualified product raw materials,
a column vectors corresponding to product batches, and
an encoding distance between any two row vectors of the encoded matrix determined based on the number of sources of product raw materials that can be unqualified;
producing products according to the product raw material combinations; and
determining sources of unqualified product raw materials according to the decision rules with the CPU, in response to product quality issues.

2. The method according to claim 1, wherein the encoding satisfies the following two conditions:
1) $|s(f^{-1}(n_k))-s(f^{-1}(n_j))| \geq C$, $C \geq 0$, $1 \leq k, j \leq N$ and $k \neq j$, $N \epsilon$ positive integers;
2) $q(m_i)=q(f(m_i))$, $1 \leq i \leq M$, $M \epsilon$ positive integers;
wherein $m_i$ denotes the $i_{th}$ product batch; $n_j$ and $n_k$ respectively denote the $j_{th}$ raw material source and the $k_{th}$ raw material source; $f( )$ denotes a component function of product batches; $f^{-1}( )$ denotes a reversed function of the component function of product batches; $q( )$ denotes a mass calculation function; $s( )$ denotes a binary encoding function; and C denotes the number of sources of potential unqualified product raw materials.

3. The method according to claim 1, wherein producing product raw material combinations corresponding to product batches based on a product production plan comprises:
determining product raw material combinations for product batches according to bits corresponding to individual unqualified product raw material sources; and
representing unqualified inspection results in column vectors corresponding to the product batches.

4. The method according to claim 3, further comprising acquiring safety risk coefficients of sources of product raw material.

5. The method according to claim 4, wherein determining product raw material combinations for the product batches further comprises:
calculating a safety risk for the product raw material combinations; and
selecting product raw material combinations that have a minimal safety risk.

6. The method according to claim 1, wherein producing decision rules for determining sources of unqualified product raw materials based on a product production plan comprises:
determining decision rules for determining sources of unqualified product raw materials based on row vectors corresponding to sources of unqualified product raw materials.

7. The method according to claim 6, wherein determining sources of unqualified product raw materials in response to product quality issues according to the decision rules further comprises:
acquiring inspection results of product batches associated with the decision rules, and uniquely determining sources of unqualified product raw materials according to the inspection results and the decision rules.

8. An apparatus for tracing product quality, comprising:
an optimization module on a central processing unit (CPU), said optimization module configured to produce product raw material combinations corresponding to product batches and decision rules for determining sources of unqualified product raw materials based on a product production plan, the optimization module including:
an acquiring module configured to obtain raw material sources, product batches, and the number of sources of product raw materials that can be unqualified, and
an encoding module configured based on the obtained raw material sources, product batches, and the number of sources of product raw materials that can be unqualified, which encodes inspection results in the two-dimensional space and produce an encoded matrix, the encoded matrix including:
row vectors corresponding to sources of unqualified product raw materials,
a column vectors corresponding to product batches, and
an encoding distance between any two row vectors of the encoded matrix is determined based on the number of sources of product raw materials that can be unqualified;
a production module on said CPU, said production module configured to produce products according to the product raw material combinations; and
a decision module on said CPU, said decision module configured to determine sources of unqualified product raw materials in response to product quality issues according to the decision rules.

9. The apparatus according to claim 8, wherein the encoding satisfies the following two conditions:

1) $|s(f^{-1}(n_k)) - s(f^{-1}(n_j))| \geq C$, $C \geq 0$, $1 \leq k, j \leq N$ and $k \neq j$, $N \in$ positive integers;

2) $q(m_i) = q(f(m_i))$, $1 \leq i \leq M$, $M \in$ positive integers;

wherein $m_i$ denotes the $i_{th}$ product batch; $n_j$ and $n_k$ denote the $j_{th}$ raw material source and the $k_{th}$ raw material source; $f(\ )$ denotes a component function of product batches; $f^{-1}(\ )$ denotes a reversed function of the component function of product batches; $q(\ )$ denotes a mass calculation function; $s(\ )$ denotes a binary encoding function; and C denotes the number of sources of potential unqualified product raw materials.

10. The apparatus according to claim 8, wherein the optimization module is further configured to determine product raw material combinations for product batches according to bits corresponding to individual unqualified raw material sources and representing unqualified inspection results in column vectors corresponding to the product batches.

11. The apparatus according to claim 10, wherein the acquiring module is further configured to acquire safety risk coefficients of product raw material sources.

12. The apparatus according to claim 11, wherein the optimization module is further configured to:
calculate a safety risk for the product raw material combinations; and
select the product raw material combinations that have a minimal safety risk.

13. The apparatus according to claim 8, wherein the optimization module is further configured to determine decision rules for determining sources of unqualified product raw materials based on row vectors corresponding to sources of unqualified product raw materials.

14. The apparatus according to claim 13, wherein the decision module is further configured to:
acquire inspection results of product batches associated with the decision rules, and uniquely determine sources of unqualified product raw materials according to the inspection results and the decision.

* * * * *